2,900,240

PREPARATION OF SODIUM BOROHYDRIDE

Edward R. Winiarczyk, Lynn, Mass., assignor to Metal Hydrides Incorporated, Beverly, Mass., a corporation of Massachusetts No Drawing. Continuation of application Serial No. 566,352, February 20, 1956. This application November 13, 1956, Serial No. 621,544

7 Claims. (Cl. 23—312)

The invention relates to the preparation of sodium borohydride and is a continuation of my application Serial No. 566,352, filed February 20, 1956, now abandoned.

The United States patent to H. I. Schlesinger and H. C. Brown No. 2,534,533 describes the preparation of sodium borohydride by reacting dry sodium hydride with an alkyl borate, such as trimethyl borate. The reaction is illustrated by the equation:

$$4NaH + B(OCH_3)_3 \rightarrow NaBH_4 + 3NaOCH_3 \quad (1)$$

The reaction mixture produced contains between about 13 to 16 percent sodium borohydride by weight, the balance being essentially sodium methoxide except for any excess sodium hydride used. The sodium borohydride is separated from the sodium methoxide by dissolving with isopropylamine or other low boiling solvent for sodium borohydride which is a non-solvent for the sodium methoxide. After separating the insoluble sodium methoxide by filtration, the solution of sodium borohydride is evaporated under vacuum to obtain solid sodium borohydride.

Sodium borohydride has been produced commercially as above described for more than five years but both the yield and the purity of the product produced has been low. Isopropylamine has been used principally as the solvent for selectively extracting the sodium borohydride from the dry reaction mixture resulting from the reaction illustrated by the above equation. In practice, the yield of solid product obtained by evaporation of the isopropylamine from this solution has been of the order of 75 percent and the purity of the product has varied between about 88 to 92 percent sodium borohydride.

When dry sodium hydride is reacted with methyl borate the reaction is slow and side reactions occur resulting in the formation of an excessive amount of impurities. This reaction has required a large excess of sodium hydride. When the dry reaction mixture thus produced is treated with a solvent, such as isopropylamine, to extract selectively the sodium borohydride a large portion of the impurities are dissolved and are found in the final solid sodium borohydride product.

Attempts have been made to overcome the above difficulties by heating methyl borate with a dispersion of finely divided sodium hydride in an inert liquid hydrocarbon, such as a mineral oil, while the dispersion is vigorously agitated. The resulting product is essentially a solid reaction mixture of sodium borohydride and sodium methoxide together with any excess sodium hydride dispersed in the liquid hydrocarbon. The principal advantages of this method are increased reaction rate and higher yield. However, the separation of the sodium borohydride from the sodium methoxide and liquid hydrocarbon has presented a difficult problem since isopropylamine and most other solvents for sodium borohydride are miscible with the liquid hydrocarbon and previous separation of the reaction mixture from the liquid hydrocarbon by filtration or centrifugation is unwieldy and difficult.

The present invention, although not limited thereto, provides an easy and economical method for recovery of sodium borohydride from the reaction mixture of sodium borohydride, sodium methoxide and excess sodium hydride dispersed in a liquid hydrocarbon prepared as described above. In accordance with the invention, the solid components of the dispersion of this reaction mixture in a liquid hydrocarbon are dissolved completely in water. This causes the sodium methoxide in the reaction mixture to be converted to methanol and sodium hydroxide and any excess sodium hydride to be converted to sodium hydroxide. Thus, an aqueous solution is formed consisting essentially of water and methanol containing sodium borohydride, sodium hydroxide and impurities in solution therein, the oil separating as a separate liquid phase. The aqueous solution is separated from the liquid hydrocarbon and can be treated with a suitable organic solvent for sodium borohydride which is substantially immiscible with the aqueous solution to dissolve the sodium borohydride selectively and obtain consistently a solution of sodium borohydride substantially free of impurities. By vacuum drying the latter solution, solid sodium borohydride can be obtained having a purity of the order of 98 to 99.5 percent sodium borohydride. Instead of using water for dissolving the solid components of the dispersion of the above reaction mixture in a liquid hydrocarbon, methanol may be used for this purpose. Then water may be added to the resulting solution to convert the sodium methoxide to sodium hydroxide and methanol either before or after said solution is separated from the liquid hydrocarbon.

Before dissolving the sodium borohydride from the aqueous solution separated from the liquid hydrocarbon, it is presently preferred to remove most of the methanol from the solution as by distillation or steam stripping under reduced pressure to obtain a liquor consisting essentially of an aqueous solution containing sodium borohydride, sodium hydroxide and some impurities in solution therein. This can be accomplished as a continuous operation, if desired. The sodium borohydride is extracted from this aqueous solution by mixing and agitating it at room temperature or a lower or higher temperature with an organic solvent for sodium borohydride which is substantially immiscible with the aqueous solution, such as isopropylamine. When permitted to settle, the mixture separates in two distinct layers, namely, an upper layer consisting of a solution of sodium borohydride in isopropylamine and a lower layer of the aqueous caustic solution partially depleted of its sodium borohydride content. The partition ratio is such that the concentration of sodium borohydride in the two layers is approximately equal. The upper layer is substantially free of impurities and is separated from the lower layer as by means of a separatory funnel. By mixing isopropylamine with the aqueous caustic solution several times, each followed by settling and removal of the upper layer, substantially all the sodium borohydride can be extracted from the aqueous caustic solution. When certain solvents are used, a better separation of the two layers may be obtained by conducting the extraction at a temperature greater than normal room temperature.

In the present preferred practice of the invention the sodium borohydride is extracted from the aqueous caustic solution in a continuous operation. This may be accomplished in any conventional continuous liquid-liquid extractor. In accordance with one practice of the invention, the aqueous caustic solution and a liquid organic solvent for sodium borohydride which is substantially immiscible with the aqueous caustic solution are caused to flow countercurrent to one another continuously in a given path, the desired extract or solution containing the sodium borohydride being removed continuously from one end of the path of countercurrent flow and an aqueous caustic solution substantially free of sodium borohydride being removed continuously from the other end of the path. The York-Scheibel-type extractor is well suited for this operation. This extractor is a mixer-settler system in which all the mixers and settlers are incorporated into a single vertical cylindrical column. Each stage consists of a mechanically agitated mixing section, separated from the next stage by a packed settling section or porous wire cylinder.

The extract or solution of sodium borohydride in isopropylamine or other organic solvent contains both water and sodium borohydride in relative amounts which approximate that for the dihydrate of sodium borohydride ($NaBH_4 \cdot 2H_2O$). The concentration of sodium borohydride in the isopropylamine is fixed by the ratio of solvent to the aqueous caustic solution used in the extraction and generally will be about 5 to 10 percent sodium borohydride by weight. These solutions are unstable if held for a substantial period of time at temperatures above about 45° C. The organic solvent and water can be removed from the solution of sodium borohydride by vacuum evaporation. Approximately one half of the isopropylamine can be removed by distillation at atmospheric pressure before the temperature of the solution rises to 45° C. The remainder of the solvent can be removed by vacuum distillation at about 150 mm. of mercury without raising the temperature of the solution above 35° C. The solid residue obtained in this manner contains considerable water of hydration which can be removed by vacuum drying. The products obtained in this manner contain between 98 to 99.5 percent borohydride.

While the invention is directed particularly to the recovery of sodium borohydride from a reaction mixture comprising sodium borohydride, sodium methoxide and excess sodium hydride dispersed in a liquid hydrocarbon, it is not necessarily so limited. Thus, the method of the invention is applicable for the recovery of sodium borohydride from the dry reaction mixture obtained by reacting methyl borate with dry sodium hydride as illustrated by Equation 1 above. This dry reaction mixture may be dissolved completely in water to form an aqueous solution which can be treated as previously described to recover the sodium borohydride. The reaction mixture of sodium borohydride and sodium methoxide also may be prepared by reacting sodium hydride with sodium trimethoxyborohydride as illustrated by the following equation:

$$3NaH + NaBH(OCH_3)_3 \rightarrow NaBH_4 + 3NaOCH_3 \quad (2)$$

While the method of the invention is directed particularly to the recovery of sodium borohydride from a reaction mixture prepared as illustrated by Equations 1 and 2 above, it is equally applicable for the recovery of sodium borohydride from the reaction mixture of sodium borohydride and sodium borate. The latter reaction mixture may be prepared by reacting sodium hydride and boric oxide as illustrated by the equation:

$$4NaH + 2B_2O_3 \rightarrow NaBH_4 + 3NaBO_2 \quad (3)$$

This reaction mixture also may be prepared by disproportionating sodium trimethoxyborohydride and then dissolving the disproportionation mixture in water. Thus, when sodium trimethoxyborohydride is moistened with certain organic liquids, such as 1,4-dioxane or tetrahydrofuran, at room temperature a reaction takes place forming a reaction mixture of sodium borohydride and sodium tetramethoxyborohydride as illustrated by the equation:

$$4NaHB(OCH_3)_3 \rightarrow NaBH_4 + 3NaB(OCH_3)_4 \quad (4)$$

When water is added to this reaction product a further reaction takes place as illustrated by the equation:

$$NaBH_4 + 3NaB(OCH_3)_4 + 6H_2O \rightarrow NaBH_4 + 3NaBO_2 + 12CH_3OH \quad (5)$$

It is presently preferred to employ isopropylamine as the organic solvent for extracting sodium borohydride from the aqueous solutions as previously described. However, any other organic solvent for sodium borohydride may be used in place of isopropylamine which is substantially immiscible and compatible with the aqueous solution under the conditions of operation. The organic solvent used should be separable from sodium borohydride, that is, capable of being removed as by evaporation. The solvent may be a mixture of water with another liquid which alone is not a solvent for sodium borohydride but when mixed with water is a solvent for sodium borohydride. Illustrative examples of other solvents which may be used in place of isopropylamine are n-butylamine, ethylene diamine, monomethylamine, monoethylamine, n-monopropylamine, pyridine, piperidine, ethanolamine, morpholine, cyclohexylamine, diethyl carbitol (diethylether of diethylene glycol), dimethylether of diethylene glycol, dimethylether of triethylene glycol, dimethylether of tetraethylene glycol, methyl Cellosolve (monomethylether of ethylene glycol), dimethylether of ethylene glycol, acetonitrile, liquid ammonia, etc.

During my initial investigations the amount of water used for dissolving the solid components of the reaction mixture of sodium borohydride and sodium methoxide was not substantially greater than the minimum amount required to dissolve the solids. It was believed that a substantial excess of water would detrimentally affect the subsequent operations and lower the recovery of sodium borohydride. When using an extractor of the general type of the York-Scheibel extractor it was found that a small amount of water could be added either to the organic solvent or to the aqueous caustic solution to avoid crystallization of sodium hydroxide in the extractor and in some instances a temperature greater than normal room temperature could be used.

Subsequently, the surprising discovery was made that in extracting sodium borohydride from the aqueous caustic solution by contacting the solution with an organic solvent for sodium borohydride, such as isopropylamine, in which water is miscible or soluble, the yield of sodium borohydride is gradually increased and its purity is gradually decreased as the dilution of either the aqueous caustic solution or the solvent or both with water is increased. It has been discovered also that the yield of sodium borohydride is a practical maximum and its purity is not excessively low when the aqueous caustic solution is extracted with an organic solvent containing up to about 15 percent of water and the aqueous caustic solution contains an amount of water such that it is saturated at ambient room temperature or a greater amount of water up to about 60 percent by weight.

The invention is illustrated further by the following specific examples. In these examples the aqueous caustic liquor treated, referred to as feed solution, was prepared by reacting methyl borate with sodium hydride dispersed in a mineral oil to form a dispersion in oil of a reaction mixture consisting of sodium borohydride, sodium methoxide and the excess sodium hydride used. The solid constituents of the oil-coated reaction mixture were completely dissolved in water and the oil separated as a separate liquid phase. The resulting aqueous solution was separated from the oil layer and most of the methanol removed by distillation to form the feed solution. In Example 6 before using this solution as feed solution it was agitated with a small amount of activated carbon for about one hour and then filtered as described in the copending application of Robert W. Bragdon, Serial No. 573,609, filed March 26, 1956, now abandoned, to remove an emulsifying agent of unknown character present as an impurity.

*Example 1*

A feed solution containing 11.8 percent sodium borohydride, 38.1 percent sodium hydroxide and 50.1±2 percent water was extracted in a five-stage counter-current manner with monoisopropylamine containing 2 percent by weight of water. The weight ratio of solvent to feed solution was 1 to 1. The apparatus consisted of five 100 cc. glass stoppered graduates used as mixer settlers. 20 grams of feed and 20 grams of solvent were added to each graduate and the phases were equilibrated by agitating. The solvent layers were then transferred and fresh solvent and feed introduced so that the phases contacted each other in the usual counter-current manner. The cycles were continued until ten additional portions of solvent and feed had been used, to assure the attainment of a steady state condition. The amine phase of the tenth cycle, which had contacted five aqueous layers, was separated. This is known as the extract and contained 9.66 percent $NaBH_4$ and the balance amine and water. The aqeuous phase of the tenth cycle, which had contacted five solvent layers, was separated. This is known as the raffinate phase, and contained 1.32 percent $NaBH_4$, and 27.9 percent sodium. The extraction yield calculated from these figures is 91.0 percent. The purity of a sample of $NaBH_4$ recovered from the extract by vacuum evaporation was 98.7 percent.

*Example 2*

In this example the sodium borohydride was extracted from the aqueous caustic solution with a liquid solvent using an eleven stage, 2-inch-diameter laboratory model York-Scheibel-type continuous countercurrent vertical column extractor, each stage consisting of a mechanically-agitated mixing section separated from the next stage by a packed settling section.

The feed solution contained 11.0 percent sodium borohydride, 39.2 percent sodium hydroxide, less than 1 percent methanol, residual amounts of impurities and 49.2±2 percent water. The solvent was isopropylamine to which 2 percent by weight of water had been added. The column was filled with the feed solution and the latter was introduced continuously near the top of the column and the solvent was introduced continuously near the bottom of the column. The feed was used as the continuous phase, that is, the interface was maintained at the top of the column. The feed solution was introduced at a rate of 30 ml. per minute and the solvent was introduced at a rate of 120 ml. per minute. The stirring speed was 250 r.p.m. After 220 minutes of operation, a steady state was reached as indicated by analyses of raffinate samples for sodium borohydride. The steady state extraction yield was calculated from the final raffinate sample as 93.1 percent. The solid product obtained by removal of solvent and water of hydration was 98 plus percent pure sodium borohydride. A larger yield can be obtained in a given extractor by altering the conditions but at the expense of capacity and a greater capacity can be obtained at the expense of yield. It may be noted that the solvent could be used as the continuous phase.

*Example 3*

An aqueous feed solution containing 9.9 percent of sodium borohydride, 34.6 percent sodium hydroxide, a small amount of sodium borate, and 55.5±2 percent water was extracted with isopropylamine containing 2 percent water in separatory funnels in a countercurrent manner, 5 stages being employed. In each movement 100 grams of feed and 91.0 grams of solvent were added. Extraction was continued until steady state was attained. Analysis of the raffinate showed that a yield of 93.9 percent was obtained. The extract contained 8.5 percent sodium borohydride and 8.4 percent water. The sodium borohydride isolated from the extract by vacuum evaporation and drying assayed 97.3 percent.

*Example 4*

An aqueous feed solution containing 11.1 percent sodium borohydride, 38.6 percent sodium hydroxide, a small amount of sodium borate and 50.3±2 percent water was extracted with isopropylamine containing 12 percent water in separatory funnels in a countercurrent manner, 5 stages being employed. In each movement 100 grams of feed solution and 114 grams of solvent were added. Extraction was continued until a steady state was attained. Analysis of the raffinate showed that a 95.5 percent yield was obtained. The extract contained 9.0 percent sodium borohydride and 8.5 percent water. The sodium borohydride isolated from the extract by vacuum evaporation and drying assayed 97.6 percent.

*Example 5*

An aqueous feed solution containing 11.1 percent sodium borohydride, 38.6 percent sodium hydroxide, a small amount of sodium borate and 50.3±2 percent water was extracted with isopropylamine containing 12 percent water in separatory funnels in a countercurrent manner, 10 stages being employed. In each movement 100 grams of feed and 114 grams of solvent were added. Extraction was continued until a steady state was attained. Analysis of the raffinate showed that a 98.2 percent yield was obtained. The extract contained 9.7 percent sodium borohydride and 11.2 percent water. The sodium borohydride isolated from the extract by vacuum evaporation and drying assayed 97.3 percent.

*Example 6*

The aqueous feed solution, which had been treated with activated carbon as described above, contained 11.1 percent sodium borohydride, 38.6 percent sodium hydroxide, a small about of sodium borate, and 50.3±2 percent water. This feed solution was extracted with isopropylamine containing 12 percent water. The operation was carried out in the York-Scheibel vertical column extractor used in Example 2. The feed was used as the continuous phase, that is, the liquid-liquid interface was maintained at the top of the column. The stirring speed was 760 r.p.m. The feed was introduced at the rate of 30 ml. per minute and the solvent at 60 ml. per minute. Samples of raffinate were analyzed periodically for percent sodium to determine when steady state was reached. After attainment of steady state, the operation was continued to permit the collection of a six liter sample of raffinate and a three liter sample of extract. Analysis of the raffinate indicated an extraction yield of 97.3 percent. The extract contained 9.3 percent sodium borohydride, 9.2 percent water and isopropylamine. Sodium borohydride isolated from the extract by vacuum evaporation and drying assayed 98.2 percent.

*Example 7*

An aqueous feed solution containing 9.2 percent sodium borohydride, 33.7 percent sodium hydroxide, a small amount of sodium borate and 57.1±2 percent water was extracted with isopropylamine containing 8.0 percent water in separatory funnels in a countercurrent manner, 5 stages being employed. In each movement 100 grams of feed solution and 104 grams of solvent were added. Extraction was continued until a steady state was attained. Analysis of the raffinate showed that a 97.1 percent yield was obtained. The extract contained 7.6 percent sodium borohydride and 13.1 percent water. The sodium borohydride isolated from the extract by vacuum evaporation and drying assayed 97.6 percent.

I claim:

1. In a method for preparing sodium borohydride, the steps which comprise dissolving in water a reaction mixture consisting essentially of sodium borohydride and sodium methoxide to form a solution consisting essentially of water and methanol containing sodium borohydride and sodium hydroxide, removing methanol from said solution to obtain an aqueous solution consisting essentially of water containing sodium borohydride and sodium hydroxide in the proportion of about one mole of sodium borohydride to each three moles of sodium hydroxide, extracting sodium borohydride from said aqueous solution with an organic liquid solvent for sodium borohydride which is substantially immiscible with said aqueous solution to obtain a solution which is essentially sodium borohydride and water dissolved in said solvent in relative amounts which approximate that for the dihydrate of sodium borohydride, and recovering solid sodium borohydride from the last mentioned solution.

2. The method of claim 1 wherein said solvent for sodium borohydride is isopropylamine.

3. In a method for preparing sodium borohydride, the steps which comprise treating with water a dispersion in an inert liquid hydrocarbon of a reaction mixture consisting essentially of sodium borohydride and sodium methoxide to dissolve said reaction mixture and form a liquor comprising said liquid hydrocarbon and a solution consisting essentially of water and methanol containing sodium borohydride and sodium hydroxide, separating said solution from the liquid hydrocarbon, removing methanol from said solution to obtain an aqueous solution consisting essentially of water containing sodium borohydride and sodium hydroxide in the proportion of about one mole of sodium borohydride to each three moles of sodium hydroxide, extracting sodium borohydride from said aqueous solution with an organic liquid solvent for sodium borohydride which is substantially immiscible with said aqueous solution to obtain a solution which is essentially sodium borohydride and water dissolved in said solvent in relative amounts which approximate that for the dihydrate of sodium borohydride, and recovering solid sodium borohydride from the last mentioned solution.

4. The method of claim 3 wherein said solvent for sodium borohydride is isopropylamine.

5. In a method for preparing sodium borohydride, the steps which comprise dissolving in water a reaction mixture consisting essentially of sodium borohydride and sodium methoxide to form a solution consisting essentially of water and methanol containing sodium borohydride and sodium hydroxide, removing methanol from said solution to obtain an aqueous solution consisting essentially of water containing sodium borohydride and sodium hydroxide in the proportion of about one mole of sodium borohydride to each three moles of sodium hydroxide, causing said aqueous solution and an organic liquid solvent for sodium borohydride which is substantially immiscible with said aqueous solution to flow countercurrent to one another in a given path, removing from one end of said path an aqueous solution substantially free of sodium borohydride and containing sodium hydroxide, removing from the opposite end of said path a solution consisting essentially of sodium borohydride dissolved in water and said solvent in relative amounts which approximate that for the dihydrate of sodium borohydride, and recovering solid sodium borohydride from the last mentioned solution.

6. The method of claim 5 wherein said solvent for sodium borohydride is isopropylamine.

7. In a method for preparing sodium borohydride, the steps which comprise forming a dispersion in an inert liquid hydrocarbon of a reaction mixture comprising essentially sodium borohydride and sodium methoxide in the proportion of about one mole of sodium borohydride to each three moles of sodium methoxide, treating said dispersion with water to dissolve the solid components of the dispersion to form a liquor comprising said liquid hydrocarbon and a solution consisting essentially of water and methanol containing sodium borohydride and sodium hydroxide, separating said solution from the liquid hydrocarbon, removing methanol from said solution to obtain an aqueous solution consisting essentially of water containing sodium borohydride and sodium hydroxide, extracting sodium borohydride from said aqueous solution with a liquid solvent for sodium borohydride which is essentially an organic liquid and is substantially immiscible with said aqueous solution to obtain an extract which is essentially sodium borohydride and water dissolved in said organic liquid in relative amounts which approximate that for the dihydrate of sodium borohydride, and recovering solid sodium borohydride from said extract, said aqueous solution containing up to about 60 percent by weight of water and said liquid solvent containing up to about 15 percent by weight of water.

References Cited in the file of this patent

UNITED STATES PATENTS

| | | |
|---|---|---|
| 2,542,746 | Banus | Feb. 20, 1951 |
| 2,720,444 | Banus | Oct. 11, 1955 |